(12) United States Patent
McDermott (10) Patent No.: US 8,773,284 B2
(45) Date of Patent: Jul. 8, 2014

(54) STEPPED INTENSITY ELECTRIC ROAD FLARE

(76) Inventor: Kevin McDermott, Rockledge, FL (US)

(*) Notice: Subject to any disclaimer, the term of this patent is extended or adjusted under 35 U.S.C. 154(b) by 248 days.

(21) Appl. No.: 12/583,418

(22) Filed: Aug. 20, 2009

(65) Prior Publication Data

US 2011/0043126 A1 Feb. 24, 2011

(51) Int. Cl.
  *G08G 1/0955* (2006.01)
  *G08B 5/38* (2006.01)

(52) U.S. Cl.
  USPC .................. 340/908; 340/473; 340/815.4

(58) Field of Classification Search
  USPC ......... 340/468, 469, 471, 473, 475, 907, 908, 340/908.1, 944, 815.4, 815.45; 362/153.1, 362/153, 230, 231, 249.02, 84
  See application file for complete search history.

(56) References Cited

U.S. PATENT DOCUMENTS

| | | | | |
|---|---|---|---|---|
| 4,347,499 A * | 8/1982 | Burkman et al. | ........ | 340/815.69 |
| 5,175,528 A * | 12/1992 | Choi et al. | .................... | 340/331 |
| 6,179,431 B1 * | 1/2001 | Chien | ............................. | 362/84 |
| 6,515,584 B2 * | 2/2003 | DeYoung | ...................... | 340/475 |
| 7,535,443 B2 * | 5/2009 | Lindqvist | ........................ | 345/82 |
| 8,400,286 B2 * | 3/2013 | Pusch | ........................... | 340/436 |
| 2002/0105432 A1 * | 8/2002 | Pederson et al. | ......... | 340/815.45 |

(Continued)

FOREIGN PATENT DOCUMENTS

WO   WO 2004104953 A1 * 12/2004   ............... G08B 5/36

OTHER PUBLICATIONS www.galls.com ----→ click on FireAuthority.com Tab (at top) ----→ click on Traffic Safety (on left hand side) ----→ click on Traffic Control Equipment.
www.nationalsafetyinc.com.

(Continued)

*Primary Examiner* — Benjamin C Lee
*Assistant Examiner* — Stephen Burgdorf
(74) *Attorney, Agent, or Firm* — Lowe Hauptman & Ham, LLP (57) ABSTRACT

A stepped intensity electric road flare having a housing supporting a circuit. The circuit comprises an led light source, a power controller and a power supply. The power controller energizes the led light source with the power supply such that the led light source emits a varying light having at least one perceived fixed intensity within a range of emitted intensities. The road flare of the present invention provides a perceived steady light having a perceived fixed intensity during a portion or time zone of its waveform thereby communicating its exact location. In addition because its intensity changes during other portions or time zones of its waveform it also demands attention. The present invention is therefore an attention getting safety device communicating its exact location. The present invention both alerts drivers to a hazard and guides them past the hazard. In addition the emitted light of the present invention is of a reddish color and concentrated by an optic into a powerful light beam. An incendiary road flare also emits a powerful light having a reddish color and, at portions of its burn cycle, perceived as a steady light. An incendiary road flare also varies its intensity during its burn cycle. Therefore the electric road flare of the present invention emits light having characteristics similar to the characteristics of the light emitted by an incendiary road flare. The present invention therefore both alerts and guides drivers with an effectiveness similar to that of the incendiary road flare. As a result of the similar light emitting characteristics oncoming drivers give the present invention the respect, attention and reaction afforded the incendiary road flare enhancing its ability to guide drivers safely past hazardous zones.

26 Claims, 5 Drawing Sheets

(56) References Cited

U.S. PATENT DOCUMENTS

| | | | |
|---|---|---|---|
| 2005/0007779 A1* | 1/2005 | Nozawa et al. | 362/253 |
| 2005/0094387 A1* | 5/2005 | Coman | 362/153 |
| 2005/0273809 A1* | 12/2005 | Kendall et al. | 725/33 |
| 2007/0097505 A1* | 5/2007 | Desjardin | 359/515 |
| 2008/0088477 A1* | 4/2008 | Martin et al. | 340/908.1 |
| 2008/0315776 A1* | 12/2008 | Openiano | 315/185 R |
| 2010/0141153 A1* | 6/2010 | Recker et al. | 315/149 |
| 2010/0308985 A1* | 12/2010 | Pusch | 340/435 |
| 2012/0074869 A1* | 3/2012 | Cronmiller | 315/295 |
| 2013/0038215 A1* | 2/2013 | Wright et al. | 315/131 |
| 2013/0285827 A1* | 10/2013 | Ivey et al. | 340/691.1 |

OTHER PUBLICATIONS www.emergencyroadflares.com.
www.turboflare360.com.
www.pflare911.com.
U.S. Department of Labor, Occupational Safety & Health Administration, "Manual on Uniform Traffic Control Devices (MUTCD)," Washington, DC 20210, <http://www.osha.gov/doc/highway_workzones/mutcd/6f_typesofdevices.html>.
Institute of Traffic Engineers, "ITE Standard for Flashing and Steady-Burn Barricade Warning Lights," Traffic Engineering, Aug. 1971, <http://www.ite.org/membersonly/itejournal/pdf/JHA71A42.pdf>.

* cited by examiner

STEPPED INTENSITY ELECTRIC ROAD FLARE

BACKGROUND OF THE INVENTION

1. Field of Invention

This invention relates to a lighting device used primarily as a warning device or road flare. The device is normally stored in the trunk of an emergency vehicle until it is needed to alert oncoming drivers of a hazard in the road. It is commonly used by first responders such as policeman or fireman however it can be used by private citizens as well. In an emergency the user removes the light from his vehicle and places it in the road to signal to approaching vehicles the fact that a hazard exists. It is common practice for several of these devices to be placed in the roadway forming a wedge to guide approaching vehicles around the hazard. Currently both incendiary and electric road flares are in use.

Federal highway laws controlled by the National Highway Traffic Safety Administration (NHTSA) included primarily in section 125 detail the requirements for warning lights in and around long term hazardous areas and job sites. In general these laws require electric lights that flash from "ON" to "OFF" when alerting drivers of a hazard. Lights that flash from "ON" to completely "OFF" are effective in drawing a driver's attention to a hazard. Flashing lights that flash completely "OFF" are especially effective in drawing a driver's attention and that is why the requirement for flashing lights exists. On the other hand electric lights emitting a steady "ON" light are specified when guiding drivers through a work zone. The steady "ON" lights have a perceived fixed intensity. They continuously communicate to a driver their exact location and are therefore effective in guiding a driver through a work zone. When guiding drivers through a hazard zone "ON-OFF" flashing lights are not normally employed as they can create confusion.

The federal law also requires the electric lights to be positioned from two to four feet above the roadway and mounted on barricades or on cones. These lights are bulky and usually too large to store within the limited space available on many emergency vehicles. In addition if struck by an oncoming vehicle they can damage the vehicle or if projected through the air, strike a first responder.

The federal laws to not apply to short term hazards such as a disabled vehicle or at the scene of a small accident. This results from the fact that it would require excessive time and equipment to set up the safety lights required by federal law for a long term hazard zone when marking a short term hazard.

The devices employed to identify short term hazards must be compact, easy to deploy and easy to retrieve. Historically incendiary road flares have filled this need. Electric road flares are currently replacing them in many situations.

Finally it is noteworthy to realize that emitted light is not always equal to perceived light. This is common knowledge to those in the field of lighting. Throughout this specification we have indicated the differences and how it applies to the concepts.

2. Prior Art

Prior art identification of short term hazard zones includes small electric lights, electric road flares or incendiary road flares that are normally placed directly on the road. The electric road flares are usually designed to be run over by oncoming vehicles without sustaining damage or being projected by an impinging vehicle towards a first responder. These small electric road flares are currently replacing prior art incendiary road flares because they avoid the burn hazards and toxic fumes created by incendiary pyrotechnic devices.

Incendiary road flares have a number of deficits. However incendiary road flares are excellent warning devices as they are highly visible warning devices which both alert and guide oncoming drivers. Incendiary road flares are powerful red light sources, constantly illuminating. During portions of their burn cycle they emit a steady light having a substantially fixed intensity. The incendiary road flare by having a fixed intensity and by being disposed directly on a roadway communicates its exact location relative to a hazard thereby improving a driver's ability to avoid an accident. However, during other portions of their burn cycle they can flare increasing their intensity. Their intensity therefore steps changing its value during their operation. The varying intensity alerts drivers to their presence. Incendiary flares are dangerous and hot. Drivers realize that the incendiary road flares are dangerously hot and tend to respect them. Drivers move as directed when incendiary road flares are in position.

The prior art electric flares currently being substituted for incendiary flares are not as effective in controlling traffic as the incendiary flares. Many are far less intense. All have light emission patterns differing from the substantially steady on, continuously emitting and randomly varying light of the incendiary flares. The prior art electric flares do not, like incendiary flares, both alert and guide oncoming drivers.

Prior art designs employ either a single led light source or a plurality of led light sources in a circle. The single led light source design is usually less expensive to manufacture. The prior art electric flares having a single led light source are either steady "ON", flashing from full "ON" to full "OFF" or flickering rapidly from "ON" to "OFF". When in the flashing mode and in the "ON" zone of its waveform the flashing light can have a dwell time long enough for a driver to progress towards perceiving the light as having a fixed intensity. Unfortunately, when in the "OFF" zone of its waveform the dwell time is usually also long such that the light visually disappears. The long "OFF" zone of the flashing waveform which follows the "ON" time ceases communication with the driver for an unacceptably long time such that the drivers eyes wander thereby losing his progress in establishing and exact location for the light or the hazard. In addition a group of flashing lights combine to make it more difficult for a driver to focus on any one of the lights to discern its fixed intensity.

If the period of the flash cycle of a light in a flash mode is reduced the light will be perceived first as a rapidly pulsing light then as a flickering light neither of which would be perceived as having a fixed intensity. A rapidly pulsing light is perceived as emitting a light having an effect between flashing and flickering whereby it visibly changes from "ON" to "OFF" but changes quickly such that its "ON" zone is not perceived as having a fixed intensity.

In the perceived steady "ON" mode of the prior art single led the led is usually not continuously emitting light but is pulsed from full "ON" to full "OFF" with an "ON" dwell time or "ON" zone of approximately 2 milliseconds and an "OFF" dwell time or "OFF" zone of approximately 3 milliseconds. The human eye integrates this pulsing light and, due to its short 5 millisecond period, perceives a steady "ON" warning light having a fixed intensity. This high frequency pulse light which is perceived as a steady light having a perceived fixed intensity is excellent for guidance as is an emitted steady "ON" light, however like an emitted steady light is inadequate for alerting.

In the flickering mode of the single led prior art design, the emitted light is controlled by a microcontroller such that the led lamp is flashing from full "ON" to full "OFF" with random pulses such that its "ON time varies from approximately 5 to 30 milliseconds and its "OFF" time varies from approximately 5 to 30 milliseconds. In this prior art design the "ON" and "OFF" times of the led are such that the human eye integrates the pulses to visualize a light that is continuously emitting but is not perceived as a steady light because it has no perceived fixed intensity. It is, in fact, visualized as a constantly changing intensity. This flicker mode, like a slow pulsing or flashing mode, is good for alerting but due to its constantly changing perceived intensity, can confuse a driver attempting to establish its exact position for guidance past a hazard. This prior art design could have the frequency of the pulses of the flicker mode decreased such that the "ON" time for the led was sufficient for a driver to perceive a fixed intensity and establish the exact location of the light. However decreasing the frequency would also lengthen the "OFF" time making the design a typical flashing light with the emitted light perceived as either steady "ON" or fully "OFF".

This perception of a rapidly pulsing light as a steady light is to be expected and is described in numerous technical sources including the reference book of the Illuminating Engineering Society. Specifically, when a rapidly pulsing light is pulsed at a frequency which exceeds a parameter identified as the critical flicker frequency relative to that design the human eye perceives the pulsing light as steady light. The exact value of the critical flicker frequency for a design depends upon a number of factors including intensity and waveform. The frequency of the pulses in the steady "ON" mode of the prior art design far exceeds the critical flicker frequency of that waveform and therefore the prior art pulsing light is perceived as a steady light having a perceived fixed intensity.

Similarly, in the flicker mode of the prior art design the led is not "ON" constantly but pulsing rapidly from "ON" to fully "OFF". The stated objective of this prior art design is a flicker mode. This flicker effect is achieved by designing the pulse frequency to be less than the critical flicker frequency. Using this design frequency the emitted light is perceived by the human eye as flickering. A flickering light is good for alerting. However as long as it is flickering it is not perceived by the human eye as having a fixed intensity. A perceived flickering light having no zone or portion of its cycle discernable as a fixed or discrete intensity fails to convey its exact location to an oncoming driver. It fails to provide a portion of its cycle having the steady light or visually fixed intensity necessary to accurately establish its location. A plurality of flickering lights further adds to the confusion as a driver looks for guidance past a hazard.

The single led prior art design offers three separate waveforms of emitted light defined as operating modes including, a pulsed steady "ON", a pulsed "FLASH" and a pulsed "FLICKER" mode. It does not disclose a single mode or waveform combining the prior art modes to improve the effectiveness of the light by both alerting and guiding oncoming drivers.

A second type of prior art electric flare employs a plurality of led light sources positioned in a circle. The plurality of led light sources are energized in sequence to create a rotating effect. In this rotating effect design each led lamp actually flashes from "ON" to "OFF" with the sequential illumination creating the rotating effect. Prior art flares having a rotating effect can confuse rather than guide oncoming drivers.

The prior art rotating effect designs usually also include the option of simultaneously flashing the entire circle of led light sources from "ON" to completely "OFF" or simultaneously energizing the entire circle using a high frequency pulse to create a perceived steady "ON" mode. It is noteworthy to realize that the prior art rotating effect electric road flares and the single led light source road flares both usually incorporate an led light source, a power controller, a power supply and a housing. In addition the power controller is usually a microcontroller which is a programmable computer. It would therefore be possible for prior art to adjust their computer program to include a perceived steady light having a discrete intensity combined with a stepped intensity to achieve the objectives of the present invention. They have not included this option as part of their design.

The prior art electric road flares have steady or flashing modes similar to the lights meeting federal laws regarding long term hazards. They perform as either guiding or alerting warning devices but not both simultaneously as is accomplished by both the incendiary road flare and the present invention.

The prior art road flare light emission patterns are not visually similar to the incendiary flares and therefore they do not receive the drivers respect required for this type of warning device.

Prior art does not include the additional features:

Prior art does not provide an electric road flare having a housing for disposition on a roadway, emitting a light perceived as a steady light during a first multiplicity of zones of its waveform and emitting a visible light perceived as different from said perceived steady light during a second multiplicity of zones of its waveform. The second multiplicity of zones alternating with the first multiplicity of zones thereby providing an alerting signal as well as guidance about a fixed hazard.

Prior art does not provide an electric road flare having a housing for disposition on a roadway, emitting a light perceived as a steady light during a first multiplicity of zones of its waveform and emitting a visible light perceived as a flickering light during a second multiplicity of zones of its waveform. The second multiplicity of zones mixed with the first multiplicity of zones thereby providing an alerting signal as well as guidance about a fixed hazard.

Prior art does not provide an electric road flare having a housing for disposition on a roadway, emitting a light perceived as a lower intensity steady light during a first multiplicity of zones of its waveform and emitting a light perceived as an upper intensity steady light during a second multiplicity of zones of its waveform. The second multiplicity of zones mixing with the first multiplicity of zones thereby providing an alerting signal as well as guidance about a fixed hazard.

Prior art does not provide an electric road flare having a housing for disposition on a roadway, emitting a light perceived as a steady light during a first multiplicity of zones of its waveform and emitting a visible light perceived as a pulsing light during a second multiplicity of zones of its waveform. The second multiplicity of zones alternating with the first multiplicity of zones thereby providing an alerting signal and guidance about a fixed hazard.

Prior art does not provide an electric road flare having a housing for disposition on a roadway, emitting a light perceived as a steady light during a first multiplicity of zones of its waveform and emitting a visible light perceived as a flashing light during a second multiplicity of zones of its waveform. The second multiplicity of zones mixed with the first multiplicity of zones thereby providing an alerting signal and guidance about a fixed hazard.

Prior art does not provide a group of electric road flares for disposition on a roadway, each flare emitting a continuously visible light having a multiplicity of alerting signal zones mixed or alternating with a multiplicity of perceived steady light or fixed intensity zones thereby providing a plurality of alerting signals and a distinct visual line of lights for guidance about a fixed hazardous zone

OBJECTS AND ADVANTAGES

The objects and advantages of the present invention are to improve upon the safety of the prior art electric road flares. The present invention is often used in groups of three to eight placed on the roadway to define short term hazards. This hazard warning system is unlike the system employed for long term hazard zones which usually employ a large number of flashing and steady electric lights mounted well above ground level on barricades. Therefore the present invention must provide an emitted light which is effective in guiding drivers past a hazard and also effective in alerting them to the existence of a hazard. Since the incendiary road flare historically used achieves these objectives one objective of the present invention is to make the electric road flare emit light having the characteristics of an incendiary road flare and to appear to an oncoming driver similar to an incendiary road flare.

In order to achieve this objective the present invention is designed to emit a light having an emitted red color similar to that of an incendiary flare and further designed to emit a concentrated powerful light beam similar to an incendiary flare. It is additionally designed to emit a stepped intensity light having at least one perceived fixed intensity. By providing a road flare emitting a stepped intensity red light having at least one fixed intensity concentrated into a powerful beam the present invention achieves the excellent visibility and safety features of the incendiary road flare without its dangerous deficits. In addition by appearing similar to an incendiary flare the present invention receives the attention and respect of oncoming drivers without the dangerous side effects of the incendiary flares.

In order to achieve the desired objectives the present invention employs a circuit having a power controller energizing an led light source with a power supply. The power controller which is usually a microcontroller is programmed to energize the led light source with a power varying within a predetermined range. The led light source is energized such that the intensity of the road flare changes but also at times remains constant long enough such that during the perceived constant intensity zone of the waveform representing the emitted light the light is perceived as being emitted at a fixed intensity. Optionally, the intensity of the led light source can step to a higher intensity and similarly remain constant at that intensity long enough to be perceived as being emitted at a second distinct intensity. In that design the emitted intensity remains within a visually perceived range of intensities. Thus, an oncoming driver can easily establish the exact location of the road flare on the road relative to a hazard even though the flare is demanding his attention by having a varying intensity.

Further objects and advantages are realized through combinations of the above distinct advantages.

SUMMARY

In accordance with the present invention an electric road flare comprises a circuit having an led light source, a power supply and a power controller. The circuit is supported by a housing. The power supply energizes the led light source with a varying power such that during a first multiplicity of zones of the intensity versus time waveform of the emitted light the emitted light is perceived as a steady light and during a second multiplicity of zones mixed with said first multiplicity of zones the emitted light is perceived as a visible light varying from the perceived steady light. The varying intensity among light zones alert an oncoming driver to a hazard and the perceived steady light zones guide him past the hazard.

DRAWINGS

Figures

| DRAWINGS - Reference Letters | | DRAWINGS - Reference Numerals | | | |
|---|---|---|---|---|---|
| C1 | Obstructing Car | 1 | housing | 2 | circuit assembly |
| C2 | Approaching Car | 3 | top | 4 | base |
| D | Drain | 5 | external threads | 6 | internal threads |
| E | Light Emitting Element | 7 | circuit board | 8A | screw |
| GA | Gate | 8B | screw | 9 | o-ring |
| GR | Ground | 10A | negative battery contact | 10B | positive battery contact |
| HB | Horizontal Light Beam | | | | |
| HD | Housing Base Diameter | 11 | spacer circuit board | 12 | plano convex lens |
| HH | Housing Height | 13 | microcontroller | 14 | battery |
| HR | Horizontal Road | 15 | switch | 16 | led |
| I | Intensity Function | 17 | resistor | 18 | resistor |
| I1 | Upper Intensity of Current Invention | 19 | resistor | 20 | mosfet |
| | | 21 | | 22 | |
| I2 | Lower Intensity of Current Invention | 23 | | 24 | |
| | | 25 | road flare | | |

| DRAWINGS - Reference Letters | | DRAWINGS - Reference Numerals |
|---|---|---|
| I3 | Upper Intensity of Prior Art Steady Waveform W2 | |
| I4 | Upper Intensity of Prior Art Flicker Waveform W3 | |
| I5 | Upper Intensity of Current Invention with Pulsed Waveform | |
| I6 | Lower Intensity of Current Invention with Pulsed Waveform | |
| K1 | Pulse of Light within Upper Intensity Zone U1P | |
| K2 | Pulse of Light within Upper Intensity Zone U1P | |
| K3 | Pulse of Light within Upper Intensity Zone U1P | |
| K4 | Pulse of Light within Upper Intensity Zone U1P | |
| K5 | Pulse of Light within Lower Intensity Zone L1P | |
| K6 | Pulse of Light within Lower Intensity Zone L1P | |
| K7 | Pulse of Light within Lower Intensity Zone L1P | |
| L1 | Lower Intensity Zone of Period P1 | |
| L1P | Lower Intensity Zone of Period P1P | |
| L2 | Lower Intensity Zone of Period P2 | |
| L2P | Lower Intensity Zone of Period P2P | |
| L5 | Lower Intensity Zone of Period P5 | |
| L8 | Lower Intensity Zone of Period P8 | |
| L9 | Lower Intensity Zone of Period P9 | |
| P1 | Period of Waveform W1 | |
| P1P | Period from Waveform W1P | |
| P2 | Period of Waveform W1 | |
| P2P | Period of Waveform W1P | |
| P5 | Period of Waveform W2 | |
| P8 | Period of Waveform W3 | |
| P9 | Period of Waveform W3 | |
| PG | Ground Pin | |
| PI | Input Pin | |
| PKL | Period of Pulses K5 thru K7 within Lower Intensity Zone L1P of Waveform W4 | |
| PKU | Period of Pulses K1 thru K4 within Upper Intensity Zone U1P of Waveform W4 | |
| PO | Output Pin | |
| R1 | Road Flare 1 | |
| R2 | Road Flare 2 | |
| R3 | Road Flare 3 | |
| R4 | Road Flare 4 | |
| S | Source | |
| T | Time Function | |
| U1 | Upper Intensity Zone of Period P1 | |
| U1P | Upper Intensity Zone of Period P1P | |
| U2 | Upper Intensity Zone of Period P2 | |
| U2P | Upper Intensity Zone of Period P2P | |
| U3 | Upper Intensity Zone of Period P3 | |
| U4 | Upper Intensity Zone of Period P4 | |
| U5 | Upper Intensity Zone of Period P5 | |
| U6 | Upper Intensity Zone of Period P6 | |

| DRAWINGS - Reference Letters | | DRAWINGS - Reference Numerals |
|---|---|---|
| U8 | Upper Intensity Zone of Period P8 | |
| U9 | Upper Intensity Zone of Period P9 | |
| VB | Battery Voltage | |
| W1 | Waveform of Present Invention | |
| W2 | Waveform of Prior Art Steady "ON" Mode | |
| W3 | Waveform of Prior Art "Flicker" Mode | |
| W4 | Pulsed Waveform Alternative for Waveform W1 | |
| XLP1 | Lower Dwell Time for Period P1 | |
| XLP1P | Lower Dwell Time for Period P1P | |
| XUP1 | Upper Dwell Time for Period P1 | |
| XUP1P | Upper Dwell Time for Period P1P | |
| XLP5 | Lower Dwell Time for Period P5 | |
| XUP5 | Upper Dwell Time for Period P5 | |
| XLP8 | Lower Dwell Time for Period P8 | |
| XUP8 | Upper Dwell Time for Period P8 | |

OPERATIONAL DESCRIPTION OF THE PREFERRED EMBODIMENT FIGS. 1-7

Figure 1:
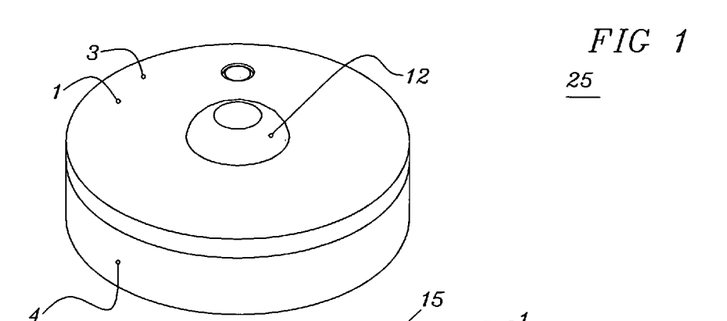
FIG. 1 is a perspective view of road flare 25 according to the present invention
Figure 2:
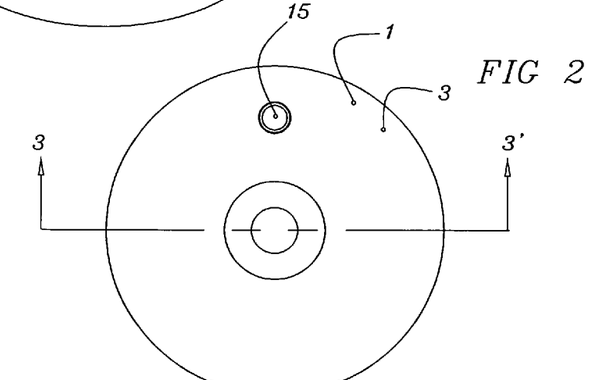
FIG. 2 is a top view of the road flare of FIG. 1
Figure 3:
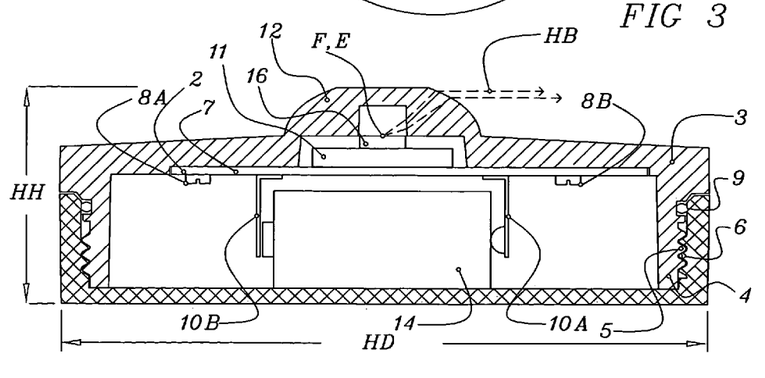
FIG. 3 is a partial cross section taken across line 3-3' of FIG. 2

Electric road flare 25 of FIGS. 1 through 7 is the preferred embodiment of the present invention. FIG. 1 is a perspective view of road flare 25. FIG. 2 is a top view of FIG. 1 and FIG. 3 is a partial cross sectional view across line 3-3' of FIG. 2. Looking at FIGS. 1 through 3 road flare 25 comprises housing 1 supporting circuit assembly 2 in housing 1. Housing 1 comprises top 3 molded of a transparent resin and base 4 also molded of a resin. Housing 1 comprises a predetermined configuration for a stable disposition on a roadway. The predetermined configuration comprises a low profile and large diameter of housing 1 wherein the ratio of the housing base diameter HD to the housing height HH exceeds two. Top 3 has external threads 5 which mate with internal threads 6 on base 4 to permit easy assembly of housing 1. O-Ring 9 seals top 3 to base 4. Housing 1 supports circuit assembly 2 which includes circuit board 7 fastened to top 3 with screw 8A and screw 8B. Circuit board 7 includes negative battery contact 10A and positive battery contact 10B for connecting battery 14 for energizing circuit assembly 2. Led 16 is connected to spacer circuit board 11 which in turn is connected to circuit board 7 so that led 16 is positioned with its light emitting element E at focal point F of circular plano convex lens 12 molded as part of top 3. Light emitted from led 16 intersects plano convex lens 12 to be redirected to form horizontal light beam HB directed throughout a 360 degree azimuth.

Figure 4:
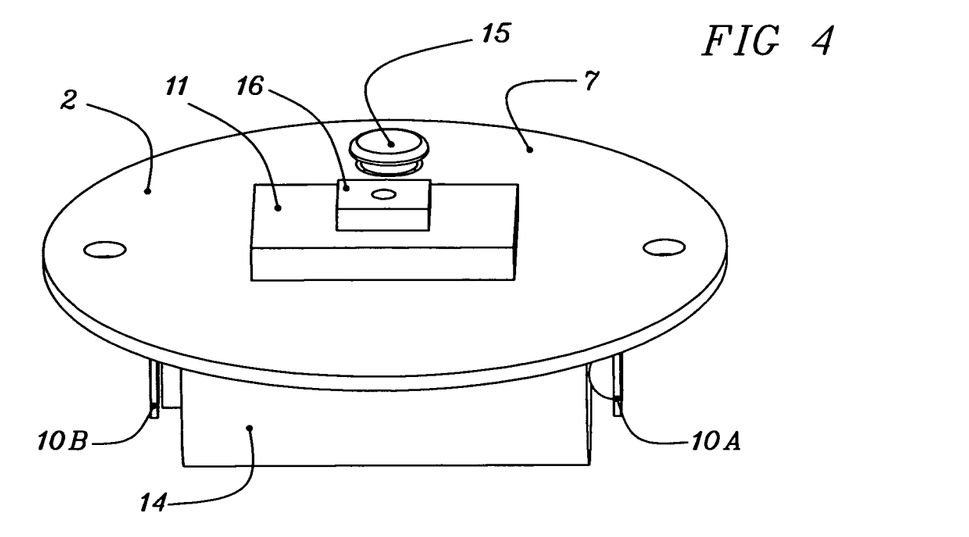
FIG. 4 is a perspective view of the circuit assembly from FIG. 3
Figure 5:
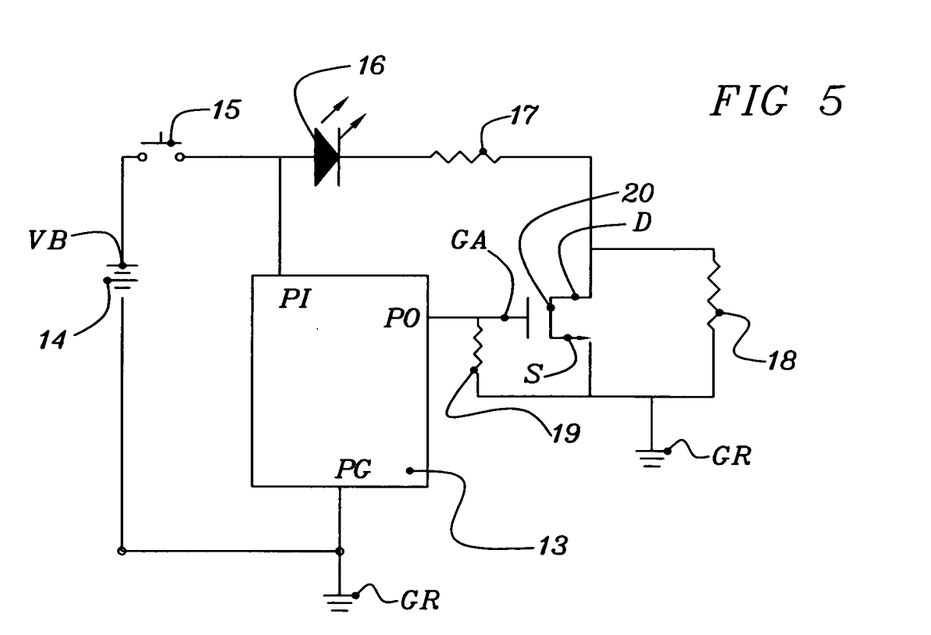
FIG. 5 is an electrical schematic of the circuit of FIG. 4

FIG. 4 is a diagrammatic perspective view of circuit assembly 2 removed from FIG. 3. FIG. 5 is an electrical schematic of circuit assembly 2. Circuit board 7 of FIG. 2 does not show many of the electronic components of FIG. 5 as these can have numerous locations and are easily positioned by one skilled in the art. In FIG. 5 circuit assembly 2 comprises a power controller, specifically in circuit assembly 2, microcontroller 13 (Cypress™ Semiconductor P/N cy8c21123-24sxi), battery 14 (a 3 volt lithium battery having battery voltage VB), switch 15 (an ON-OFF push button switch), led 16 (a red light emitting surface mount led lamp CREE™ P/N XRE), resistors 17, 18 and 19 and mosfet 20 (Zetex™ P/N zxmn6a07 fta). Using typical design techniques circuit board 7 will include the means to support and connect all of the components of circuit assembly 2 to effect the electrical schematic of FIG. 5.

Microcontroller 13 is flashed with program code to function as an oscillator that toggles the voltage at output pin PO between battery voltage VB of battery 14 and zero volts with a randomly generated duty cycle. With switch 15 closed microcontroller 13 is energized at input pin P1 and toggles the voltage at output pin PO relative to ground pin PG and to ground GR. When the voltage at output pin PO is equal to battery voltage VB gate GA—source S junction of mosfet 20 is forward biased which in turn allows current to flow through drain D—source S junction. This allows the maximum predetermined current flow through led 16 and resistor 17 to ground GR. When the voltage at output pin PO is zero mosfet 20 is turned "OFF". Gate GA—source S junction of mosfet 20 is therefore not forward biased. Resistor 19 pulls gate GA of mosfet 20 to ground GR. This prevents current from flowing through drain D—source S junction of mosfet 20. Instead of flowing through mosfet 20 the current flows through resistor 18 which illuminates led 16 with the minimum predetermined current. Microcontroller 13 is programmed to continually randomly toggle the voltage at output pin PO as long as switch 15 is closed. This circuit creates a stepped intensity random period emitted light which continuously emits light having waveform W1 of FIG. 7 to be described later. One skilled in the art would easily be able to set the predetermined currents and to provide the required program code. There are numerous other electronic circuits which can achieve the desired result of having led 16 emit a continuously visible stepped intensity random period emitted light having at least one perceived fixed intensity. Adjustments to the program code and circuit can change the predetermined maximum and minimum current applied to led 16. Microcontroller 13 varies the current and therefore the power supplied to led 16. The power supplied to led 16 determines the waveform of the emitted light. Hence, the predetermined range of current supplied by microcontroller 13 to led 16 establishes a predetermined range of power resulting in a predetermined waveform of emitted light and a range of intensity of the light emitted by led 16. A person skilled in the art can design circuit assembly 2 or alternatively use other circuit designs to provide a road flare emitting light at a high or upper intensity for a predetermined higher intensity dwell time and a lower intensity for a predetermined lower intensity dwell time. The present invention would require that the dwell time of at least one of the levels of intensity be sufficiently long such that a typical human eye will perceive it as a steady light having a fixed intensity. The lower intensity is usually the intensity with the long dwell time as this is the intensity used to guide a driver past a hazard. The predetermined dwell time adequate for a particular use can be easily programmed into microcontroller 13 with the optimal value for this parameter determined by a number of use factors such as color of emitted light, ambient lighting, vehicle speeds, etc. Dwell times of at least 400 milliseconds for the lower intensity have, for some uses, been found acceptable. Longer dwell times improve the ability of a driver to establish that the light is steady and to thereby determine its location. However shorter lower intensity dwell times beneficially reduce the elapsed time between the alerting effect of the upper intensity zones. Therefore, the lengths of the upper and lower intensity dwell times and the ratio between them will effect the ability of the road flare to direct drivers past the hazard. The optimum values for the dwell times will be a function of a number of variables including vehicle speed and ambient light. However, the lower intensity dwell time should, in most designs, generally exceed four times the upper intensity dwell time.

Figure 6:
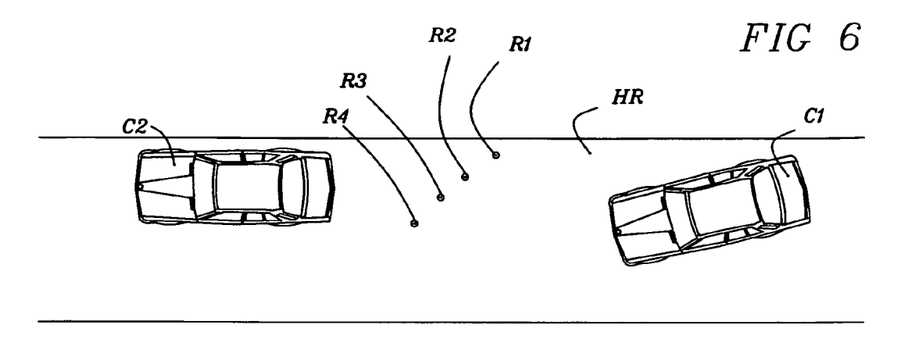
FIG. 6 is a top view of a typical roadway hazard scene employing four FIG. 1 road flares to prevent an accident

FIG. 6 is a top view of a typical use for road flare 25 on a horizontal road HR where obstructing car C1 is inoperable and road flares R1, R2, R3 and R4 similar to road flare 25 are placed in a wedge formation to direct approaching car C2 safely around. Road flare 25 is constructed with a wide base, low profile and low center of gravity so that it can be placed on a road and resist displacement by wind or vibration. In addition due to its predetermined configuration it can withstand accidental run over by approaching vehicles and resist being accidentally knocked from its position on the road. Road flare 25 is placed directly on a road to indicate hazards such as disabled cars, pot holes, etc. Once placed it has a fixed relationship on the road relative to the hazard. Oncoming drivers using the steady light zones of the emitted light waveform can establish the exact location of each of road flares R1 through R4 and therefore can see a distinct line of lights indicating the exact path to follow relative to the hazard to avoid the hazard. This advantage would be seriously degraded if road flares R1 through R4 were placed on a barricade several feet above ground level as required by NHTSA for long term hazards. The relationship between road flares R1 through R4 and the hazard would change drastically due to their height above the road as the oncoming driver approached the hazard. Thus the combination of placing the road flares on the road and the road flares emitting a perceived steady light is of significant value when guiding a driver past a hazard. The stepped intensity of the present invention additionally alerts the driver making the present invention a superior safety device.

Figure 7:
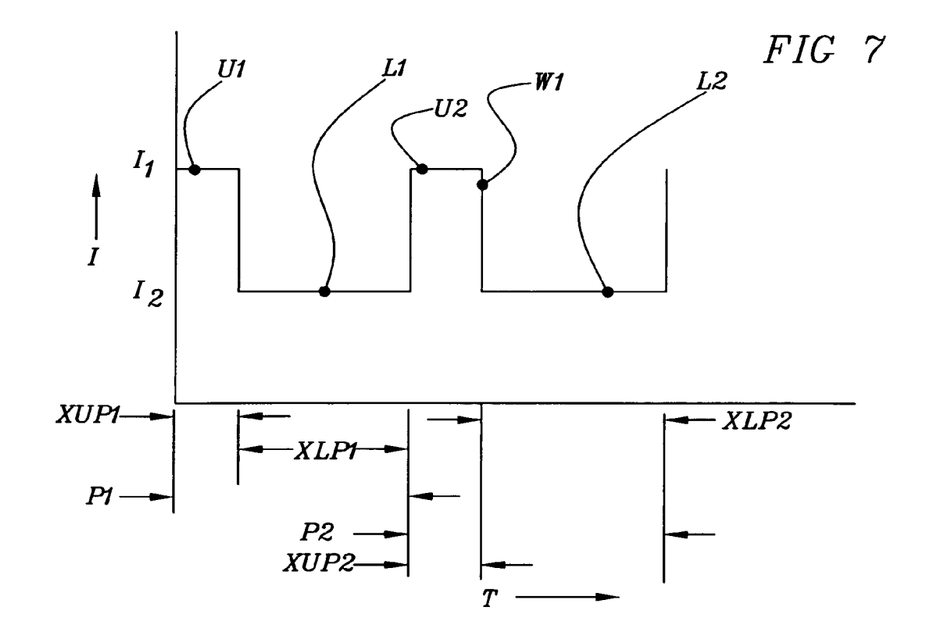
FIG. 7 is an intensity versus time diagram of the light emitted from the road flare of FIG. 1

FIG. 7 is an intensity I versus time T diagram of waveform W1 of the light emitted from road flare 25 of FIG. 1. FIG. 7 shows waveform W1 which represents the light actually emitted during two periods of emitted intensity. The relationship between emitted light and perceived light will be related to the waveform and will be discussed as we proceed. Period P1 emits light at upper intensity zone U1 of waveform W1 at upper intensity I1 having an upper dwell time XUP1 followed by lower intensity zone L1 of waveform W1 in which the intensity is reduced to lower intensity I2 for lower dwell time XLP1. This is followed by period P2 which emits light at upper intensity zone U2 at upper intensity I1 for an upper dwell time XUP2 followed by lower intensity zone L2 in which the intensity is reduced to lower intensity I2 for lower dwell time XLP2. Road flare 25 continues to emit light according to waveform W1 and waveform W1 continues with additional similar random periods which are not shown. Thus as represented by waveform W1 the emitted light from led 16 randomly varies such that both the upper intensity zones and the lower intensity zones are periodic with irregular periods. In the present embodiment of the current invention the periods are irregular and randomly change. The shape of waveform W1 can change and still represent a design employing the concepts of the current invention. It could, for example, be acceptable for the periods to be regular or nonrandom. It could also be acceptable for some alternate types of zones to be mixed within waveform W1. Hence, even though the shape of waveform W1 varies it is limited to predetermined parameters which are selected such that the emitted light complies with the stated objectives of the present invention.

Since in accordance with basic optics the frequency is defined as the inverse of the period and since periods P1 and P2 are varying the frequency varies. In the present invention the period and therefore the frequency is programmed to randomly vary. In the present invention the waveforms and periods are predetermined such that when the light is in a lower intensity zone portion of waveform W1 such as lower intensity zone L1 its dwell time, such as lower dwell time XLP1, is long enough for an oncoming driver to perceive it as a substantially steady light having a substantially fixed intensity. In perceiving the emitted light as at a substantially fixed intensity or equivalently as a steady light during a predetermined length of time the driver will be able to establish its discrete location on the road relative to the hazard and thereby avoid running over the light or more importantly running into the hazard. It is noteworthy to realize that since the emitted light will be stepping between at least two intensity levels the perceived intensity may not always be the same as the emitted intensity of FIG. 7. The differential between the actual and perceived intensities will depend upon many factors including waveform, intensity levels, etc. Nevertheless the long dwell times of the lower intensity zones of waveform W1 combined with the unchanging intensity within each lower intensity zone effectively equalize the actual and perceived intensities of the light emitted during the lower intensity zones of the waveform. By providing a substantially perceived steady light having a perceived fixed intensity in the lower intensity zones of waveform W1 the present invention communicates its distinct location on the road relative to a hazard to oncoming drivers thereby providing the guidance necessary to reduce accidents.

In addition to providing guidance using light emitted during lower intensity zone L1 road flare 25 alerts drivers using light emitted during upper intensity zone U1 of waveform W1. Looking again at upper intensity zone U1 the upper intensity dwell time XUP1 can be short because upper intensity zone U1 is included to alert rather than guide the driver. The driver does not have to perceive the light emitted during upper intensity zone U1 as steady. The high intensity and short dwell time of upper intensity zone U1 effectively alerts the driver. Waveforms having lower intensity dwell times which exceed ten times the upper intensity dwell times represent one class of designs which employ the concepts of the present invention. The long lower intensity or fixed intensity dwell time assures the driver or observer the time needed to establish the exact location of the road flare. A very short upper intensity or alerting light zone dwell time assures that the driver will not lose the location of the road flare. The fact that the upper intensity zone usually comprises a short dwell time relative to the lower intensity or steady light zone coupled with the fact that light is perceived as continuously emitted during both the upper and lower intensity zones makes it easy for a driver to establish and maintain the location of road flare 25.

Upper intensity zone U1 can, within the scope of the present invention, comprise any of a variety of waveforms each designed to accomplish a specific effect. For example a series of short pulses of light can be included to create a flicker effect within upper intensity zone U1. Alternatively the dwell time of upper intensity zone U1 can be selected as shown in FIG. 7 such that a driver can perceive it as a steady light having a perceived fixed intensity thereby adding to the effect of lower intensity zone L1 in identifying an exact location of road flare 25. It is to be noted that establishing a long dwell time for upper intensity zone U1 such that a driver perceives it as a steady light permits a driver to define the exact location of road flare 25 at all times during its waveform.

Thus upper intensity zone U1 can be designed to comprise a single short pulse of high intensity light, a series of quick pulses, a flicker effect, a series of lengthened dwell time pulses to create a high intensity-low intensity flash or a high intensity long dwell time zone creating a high intensity fixed intensity light to be used for guidance and warning. Road flare 25 therefore emits a perceived steady light having a perceived intensity during the lower intensity zone L1 of waveform W1 and also emits a light distinct from the perceived steady light during an upper intensity zone U1 of waveform W1. Finally it is acceptable for waveform W1 to include additional high intensity zones or other light emitting zones conforming with the dual objectives of alerting and guiding as disclosed in this specification.

The lower intensity zone L1 is included to define the location of road flare 25 and guide the driver past the hazard. Lower intensity zone L1 does not consist of a flicker effect waveform as found in prior art because the flicker effect does not provide the driver with the visual information required for him to establish the distinct location of road flare 25. In FIG. 7—which is diagrammatic only and not drawn exactly to size—period P1 is 1000 milliseconds, period P2 is 1200 milliseconds, upper dwell time XUP1 for period P1 is 150 milliseconds and upper dwell time XUP2 for period P2 is 200 milliseconds. Lower dwell time XLP1 for period P1 is 850 milliseconds and lower dwell time XLP2 for period P2 is 1000 milliseconds. Other dwell times for the parameters and zones in FIG. 7 can be employed while still implementing the concepts of the present invention.

Figure 8:
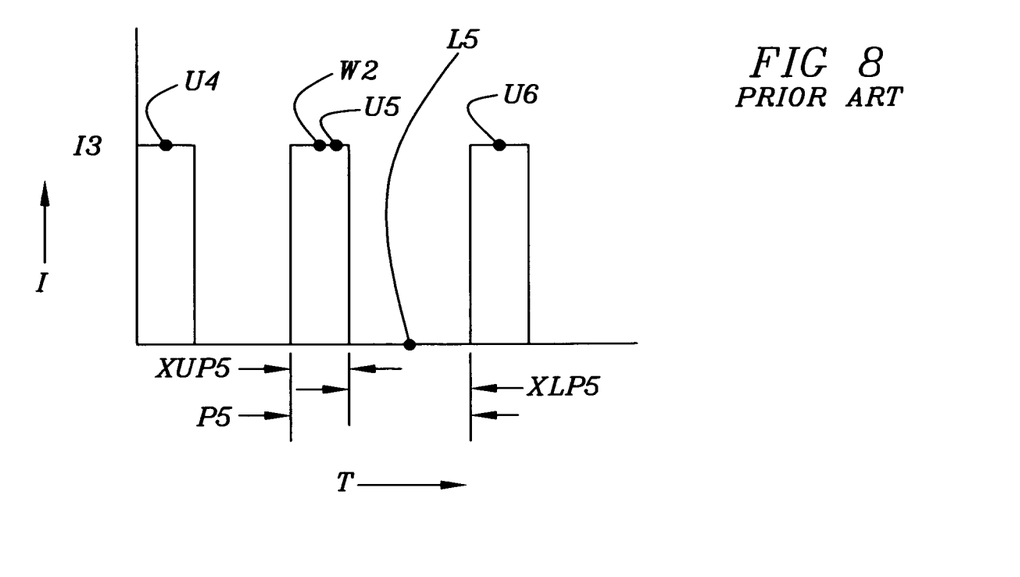
FIG. 8 is an intensity versus time diagram of the light emitted from a prior art light in steady "ON" mode

FIG. 8—which is diagrammatic and not drawn exactly to size—is an intensity versus time diagram of the light emitted from a prior art light in a steady "ON" mode. In FIG. 8 waveform W2 comprises a series of identical high intensity high frequency pulses of light including upper intensity zone U4, upper intensity zone U5 and upper intensity zone U6. Period P5 of waveform W2 is typical and comprises upper intensity zone U5 emitting light at upper intensity I3 having an upper intensity dwell time of XUP5. Period P5 also includes lower intensity zone L5 having zero intensity and lower intensity dwell time XLP5. Waveform W2 is a typical prior art pulsed waveform with a period P5 of 5 milliseconds. This type of waveform is found in many led lights. It emits light in rapid pulses but is perceived by the human eye as a steady light of a fixed intensity. The human eye perceives a pulsing or flickering light as a steady light if the frequency of the pulses exceeds the critical flicker frequency for the design. The critical flicker frequency employs a number of variables to determine its exact value but it approximates 120 hertz. Waveform W2 comprises a frequency of 200 hertz and therefore even though it is pulsing from "ON" to "OFF" it will be perceived as a steady light. Its perceived steady intensity will be substantially less than emitted upper intensity I3.

Figure 9:
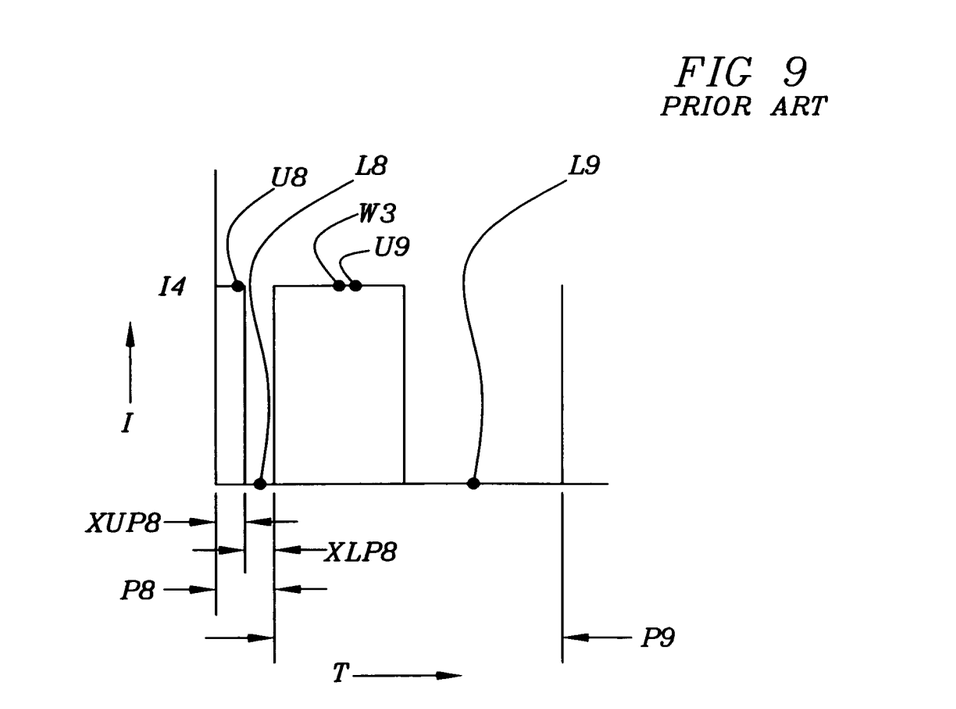
FIG. 9 is an intensity versus time diagram of the light emitted from a prior art light in a flicker mode

FIG. 9 is an intensity versus time diagram—not drawn to size—of the light emitted from a single led prior art design emitting light defined as a flicker mode. Looking at FIG. 9 waveform W3 comprises period P8 followed by period P9 which is followed by a continuous series of similar but random periods not shown. Period P8 comprises upper intensity zone U8 having upper dwell time XUP8 emitting light at upper intensity I4. Period P8 also includes lower intensity zone L8 emitting no light—therefore having zero intensity—and having lower intensity dwell time XLP8. Period P9 comprises upper intensity zone U9 emitting light at intensity I4 followed by lower intensity zone L9 emitting no light and therefore having zero intensity. Emitting at zero intensity indicates emitting no light. Periods P8 and P9 are generated by a microcontroller to randomly vary and to have varying upper intensity and lower intensity dwell times. The lighting device which includes a waveform such as waveform W3 is described by the manufacturer as having a flickering mode and that is the perceived effect achieved by the design. The intensity is perceived as constantly changing and constantly emitting. This result is achieved by designing the waveform such that the emitted light is pulsed at a frequency below the critical flicker frequency for that design. The waveform for this design indicates periods ranging between approximately 25 to 50 milliseconds for the varying periods thereby indicating frequencies varying between 40 and 20 hertz. Since these frequencies are less than the critical flicker frequency this prior art light flickers as claimed. It is a good design for alerting but does not provide the perceived steady light having a fixed intensity which is necessary to establish the exact location of the road flares.

Figure 10:
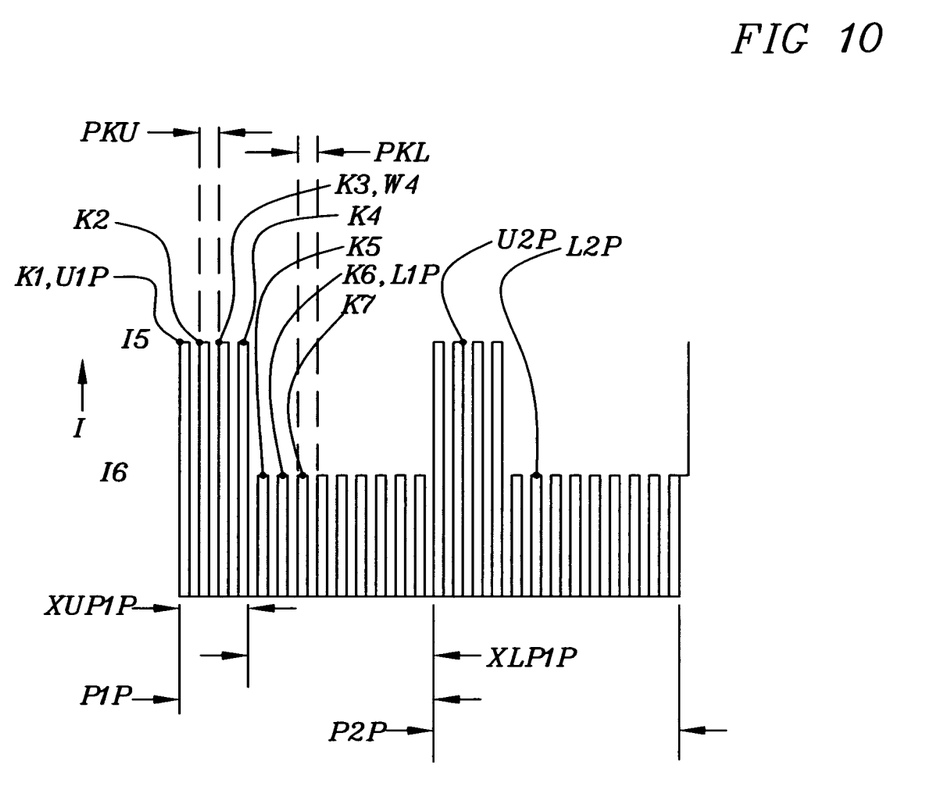
FIG. 10 is an intensity versus time diagram similar to FIG. 7 except that high frequency pulses are employed in the upper and lower intensity zones

FIG. 10 is not prior art. It is a diagrammatic—not to size—intensity versus time diagram of waveform W4 depicting a pulsing waveform which can be substituted for waveform W1 of FIG. 7 in the current invention. Waveform W4 is an alternate waveform of the current invention. Waveform W4 includes periods P1P and P2P followed by a continuous series of similar periods not shown. Pulses K1, K2, K3 and K4 all emit light at intensity I5 within upper intensity zone U1P of period P1P. Although only four pulses are identified the actual quantity will differ and will depend upon the parameters of waveform W4. Period PKU is the period of pulse K2 representative of pulses K1, K3, K4 and all other pulses within upper intensity zone U1P of waveform W4. Assume that period PKU is 5 milliseconds. Pulses K1 through K4 each emit light at intensity I5.

Looking at lower intensity zone L1P pulses K5 through K7 are identified however the actual quantity of pulses within lower intensity zone L1P will be a large number. Pulses K5, K6 and K7 all emit light at intensity I6 within lower intensity zone L1P of period P1P. Period PKL is the period of pulse K7 representative of K5, K6 and all other pulses within lower intensity zone L1P of waveform W4. Assume that period PKL is 5 milliseconds. The upper intensity zone U1P and the lower intensity zone L1P of period P1P of waveform W4 each emit within their zones a pulsing light at high frequencies well above the critical flicker frequency for the design. Due to the magnitude of periods PKU and PKL the frequency within the upper intensity zone U1P is 200 hertz and the frequency within the lower intensity zone L1P is also 200 hertz. In this design although each zone is actually emitting a high frequency pulsing light it will, when viewed, be perceived as a steady light. The perceived intensity of the perceived steady light will be less than the actual intensity of the light emitted by the individual pulse. This analysis is identical to that previously discussed relating to FIG. 8 where prior art employed a series of high frequency pulses of light to create a perceived steady light.

Now looking at FIG. 10 period P1P includes high intensity zone U1P having upper dwell time XUP1P emitting an "ON-OFF" high frequency pulsing light at intensity I5 followed by lower intensity zone L1P having lower dwell time XLP1P emitting an "ON-OFF" high frequency pulsing light at a reduced intensity I6.

Now looking at both FIGS. 7 and 10 and setting period P1 equal to period P1P, upper dwell time XUP1 equal to upper dwell time XUP1P and lower dwell time XLP1 equal to lower dwell time XLP1P it can be seen that the human eye will perceive both waveforms as emitting light having a stepped intensity and also as a steady fixed intensity light at each intensity. Period P2P of waveform W4 having upper intensity zone U2P and lower intensity zone L2P is similar to period P2 of waveform W1 having upper intensity zone U2 and lower intensity zone L2. All remaining periods of each waveform would be similarly related. Hence pulsing waveform W4 of FIG. 10 can create the perceived stepped intensity desired of the current invention. Waveform W4 will, like waveform W1, have a perceived steady light during its lower intensity zone L1P. It will also have a perceived steady light during its upper intensity zone U1P.

Due to the high frequency pulsing characteristic of waveform W4 the perceived intensities of FIG. 10 will be less than the emitted intensities I5 and I6. Therefore if intensities I5 and I6 of FIG. 10 are each set to a predetermined value higher than intensities I1 and I2 of FIG. 7 their perceived values can be made to equal the perceived intensities of the waveform of FIG. 7 making light emitted according to waveform W4 the perceived equal of light emitted according to waveform W1.

Also, in place of establishing the upper intensity zones of waveform W4 as a perceived steady light waveform W4, can as previously described for waveform W1 of FIG. 7, have period PKU increased to below the critical flicker frequency to create a perceived flicker effect during upper intensity dwell time XUP1P. If period PKU is further increased the light emitted during upper intensity zone U1P of waveform W4 will create a perceived pulsing effect. Finally, if period PKU is again increased the emitted light during upper intensity zone U1P will be perceived as a flashing light. Thus, the periods typified by pulses K1 through K4 can be selected to effect a flashing, pulsing or flickering effect while still incorporating the elements of the present invention.

Also, waveforms W1 and W4 of the present invention continue to emit light beyond the periods shown in FIGS. 7 and 10 creating a multiplicity of both upper intensity and lower intensity zones. The upper intensity zones and the lower intensity zones typically alternate within the waveforms. The parameters may change as the waveforms are randomly generated, however the parameters are limited to achieve the perceived lighting objectives of the present invention as defined within this specification. The multiplicity of periods and zones representing the emitted light are mixed and typically alternate.

Although designs employing pulsing led light sources at a frequency exceeding the critical flicker frequency as detailed in FIG. 8 can improve visibility, are employed in prior art and can be employed in the present invention for some uses the pulsing design has deficits relative to the steady emitting configuration of the current invention as shown in FIG. 7. This results because although a driver may perceive a high frequency pulsing light as a steady light when that driver is stationary that same driver can perceive the light as flickering or pulsing when he is moving. This can confuse drivers and create accidents. Increasing the pulse frequency well beyond the critical flicker frequency can ameliorate this problem. However, employing a design emitting a non-pulsing steady light avoids the problem.

Thus the scope of the invention should be determined by the appended claims and their legal equivalents rather than by the examples given.

I claim:
1. A lighting device including:
an electric road flare having a circuit assembly supported in a housing, said housing configured for disposition on a roadway;
said circuit assembly comprising an LED light source, a power supply and a power controller, said power controller varying a power to said LED light source from said power supply; and
said light source perceived as continuously emitting a light varying according to a waveform of intensity versus time, wherein said waveform is predetermined by said power controller, and the waveform comprises a plurality of perceived substantially steady intensity light zones and a plurality of perceived varying intensity light zones, each perceived substantially steady light intensity zone of said plurality of perceived substantially steady intensity light zones having a perceived intensity lower than an intensity of each perceived varying intensity zone of said plurality of perceived varying intensity light zones, and each of said plurality of perceived substantially steady intensity light zones having a dwell time exceeding ten times a dwell time of each perceived varying intensity light zone of said plurality of perceived varying intensity light zones, whereby said road flare upon being placed on a roadway about a hazard alerts a driver to the hazard and continuously guides him about the hazard.

2. The lighting device according to claim 1 wherein said electric road flare further comprises:
said light intersecting a transparent top of said housing and directed by an optic into a horizontal beam directed about a 360° azimuth.

3. The lighting device according to claim 1 further comprises:
at least one additional electric road flare, the at least one additional electric road flare having a circuit assembly supported in a housing, said housing configured for disposition on a roadway, whereby the electric road flare and the at least one additional electric road flare upon being placed on a roadway about a hazard continuously collectively communicate a distinct line of lights for guiding the driver past the hazard.

4. The lighting device according to claim 1 wherein:
each perceived substantially steady intensity light zone of said plurality of perceived substantially steady intensity light zones having a dwell time of at least 400 milliseconds.

5. The lighting device according to claim 1 wherein:
each perceived substantially steady intensity light zone of said plurality of perceived substantially steady intensity light zones comprises a series of high frequency pulses of light.

6. A lighting device including:
an electric road flare having a circuit assembly supported in a housing, said housing configured for disposition on a roadway;
said circuit assembly comprising an LED light source, a power supply and a power controller, said power controller varying a power to said LED light source from said power supply; and
said light source perceived as continuously emitting a light varying according to a waveform of intensity versus time, wherein said power controller is configured to predetermine said waveform, and said waveform comprises a plurality of lower intensity perceived substantially steady intensity light zones and a plurality of upper intensity light zones, each lower intensity perceived substantially steady intensity zone of said plurality of lower intensity steady intensity light zones having a perceived intensity lower than an intensity of each upper intensity light zone of said plurality of upper intensity light zones, and each of said plurality of lower intensity perceived substantially steady intensity light zones having a dwell time exceeding ten times a dwell time of each upper intensity light zone of said plurality of upper intensity perceived substantially steady intensity light zones, whereby said road flare upon being placed on a roadway about a hazard alerts a driver to the hazard and continuously guides him about the hazard.

7. The lighting device according to claim 6 said electric road flare further comprises:
said light intersecting a transparent top of said housing and directed by an optic into a horizontal beam directed about a 360° azimuth.

8. The lighting device according to claim 6 which further comprises:
at least one additional electric road flare, the at least one additional electric road flare having a circuit assembly supported in a housing, said housing configured for disposition on a roadway, whereby the electric road flare and the at least one additional electric road flare upon being placed on a roadway about a hazard collectively continuously communicate a distinct line of lights for guiding the driver past the hazard.

9. The lighting device according to claim 6 wherein:
each lower intensity perceived substantially steady intensity zone of said plurality of lower intensity perceived substantially steady intensity light zones having a dwell time of at least 400 milliseconds.

10. The lighting device according to claim 6 wherein:
said lower intensity perceived substantially steady intensity light zones comprise a series of high frequency pulses of light.

11. A lighting device including:
an electric road flare having a circuit assembly supported in a housing, said housing configured for disposition on a roadway;
said circuit assembly comprising an LED light source, a power supply and a power controller, said power controller varying a power to said LED light source from said power supply; and
said light source perceived as continuously emitting a light, said light varying according to a waveform of intensity versus time, wherein said power controller is configured to predetermine said waveform, and said waveform comprises a plurality of perceived substantially steady intensity light zones and a plurality of perceived flickering light zones, each perceived substantially steady intensity light zone of said plurality of perceived substantially steady intensity light zones having a perceived intensity lower than an intensity of each perceived flickering light zone of said plurality of flickering light zones, and each of said plurality of perceived substantially steady intensity light zones having a dwell time exceeding ten times a dwell time of each perceived flickering light zone of said plurality of flickering light zones, whereby said road flare upon being placed on a roadway about a hazard alerts a driver to the hazard and continuously guides him about the hazard.

12. The lighting device according to claim 11 wherein said electric road flare further comprises:
said light intersecting a transparent top of said housing and directed by an optic into a horizontal beam.

13. The lighting device according to claim 11 which further comprises:
at least one additional electric road flare, the at least one additional electric road flare having a circuit assembly supported in a housing, said housing configured for disposition on a roadway, whereby the electric road flare and the at least one additional electric road flare upon being placed on a roadway about a hazard collectively continuously communicate a distinct line of lights for guiding the driver past the hazard.

14. The lighting device according to claim 11 wherein:
each perceived substantially steady intensity light zone of said plurality of perceived substantially steady intensity light zones having a dwell time of at least 400 milliseconds.

15. The lighting device according to claim 11 wherein:
each perceived substantially steady intensity light zone of said plurality of perceived substantially steady intensity light zones comprises a series of high frequency pulses of light.

16. A lighting device including:
an electric road flare having a circuit assembly supported in a housing, said housing configured for disposition on a roadway;
said circuit assembly comprising an LED light source, a power supply and a power controller, said power controller varying a power to said LED light source from said power supply; and
said light source perceived as continuously emitting a light, said light varying according to a waveform of intensity versus time, wherein said power controller is configured to predetermine said waveform, and said waveform comprises a plurality of perceived substantially steady intensity light zones and a plurality of perceived pulsing light zones, each perceived substantially steady intensity light zone of said plurality of perceived substantially steady intensity light zones having a perceived intensity lower than an intensity of each perceived pulsing light zone of said plurality of perceived pulsing light zones, and each of said plurality of perceived substantially steady intensity light zones having a dwell time exceeding ten times a dwell time of each perceived pulsing light zone of said plurality of perceived pulsing light zones, whereby said road flare upon being placed on a roadway about a hazard alerts a driver to the hazard and continuously guides him about the hazard.

17. The lighting device according to claim 16 wherein said electric road flare further comprises:
said light intersecting a transparent top of said housing and directed by an optic into a horizontal beam.

18. The lighting device according to claim 16 wherein said electric road flare further comprises:
said power supply is a battery contained within said housing.

19. The lighting device according to claim 16 wherein:
each perceived substantially steady intensity light zone of said plurality of perceived substantially steady intensity light zones having a dwell time of at least 400 milliseconds.

20. The lighting device according to claim 16 wherein:
each perceived substantially steady intensity light zone of said plurality of perceived substantially steady intensity light zones comprises a series of high frequency pulses of light.

21. A lighting device including:
an electric road flare having a circuit assembly supported in a housing, said housing configured for disposition on a roadway;
said circuit assembly comprising an LED light source, a power supply and a power controller, said power controller varying a power to said LED light source from said power supply; and
said light source perceived as continuously emitting a light, said light varying according to a waveform of intensity versus time, wherein said power controller is configured to predetermine said waveform, and said waveform comprises a plurality of perceived substantially steady intensity light zones and a plurality of perceived flashing light zones, each perceived substantially steady intensity light zone of said steady intensity light zones having a perceived intensity lower than an intensity of each perceived flashing light zone of said plurality of perceived flashing light zones, and each of said plurality of perceived substantially steady intensity light zones having a dwell time exceeding ten times a dwell time of each perceived flashing light zone of said plurality of perceived flashing light zones, whereby said road flare upon being placed on a roadway about a hazard alerts a driver to the hazard and continuously guides him about the hazard.

22. The lighting device according to claim 21 wherein said electric road flare further comprises:
said light intersecting a transparent top of said housing and directed by an optic into a horizontal beam.

23. The lighting device according to claim 21 wherein:
each perceived substantially steady intensity light zone of said plurality of perceived substantially steady intensity light zones having a dwell time of at least 400 milliseconds.

24. The lighting device according to claim 21 wherein said electric road flare further comprises:
each perceived substantially steady intensity light zone of said plurality of perceived substantially steady intensity light zones comprises a series of high frequency pulses of light.

25. The lighting device according to claim 21 which further comprises:
at least one additional electric road flare, the at least one additional electric road flare having a circuit assembly supported in a housing, said housing configured for disposition on a roadway, whereby the electric road flare and the at least one additional electric road flare upon being placed on a roadway collectively continuously communicate a distinct line of lights for guiding the driver past the hazard.

26. A warning system including:
at least three electric road flares, each of said road flares including a circuit assembly supported in a housing configured for disposition on a roadway;
each said circuit assembly comprising an LED light source, a power supply and a power controller for varying a power to said LED light source from said power supply; and
each said light source perceived as continuously emitting a light, said light varying according to a waveform of intensity versus time, wherein said power controller is configured to predetermine said waveform, and said waveform comprises a plurality of perceived steady intensity light zones and a plurality of varying intensity light zones, each perceived steady intensity light zone of said plurality of perceived steady intensity light zones having an intensity lower than an intensity of each varying intensity light zone of said plurality of varying intensity light zones, and each of said plurality of perceived substantially steady intensity light zones having a dwell time exceeding ten times a dwell time of each perceived varying intensity light zone of said plurality of perceived varying intensity light zones, whereby the road flares upon being placed on a roadway about a hazard alert a driver to the hazard and continuously communicate a distinct line of lights for guiding the driver past the hazard.

* * * * *